(12) United States Patent
Lee et al.

(10) Patent No.: US 9,927,930 B2
(45) Date of Patent: Mar. 27, 2018

(54) TOUCH SENSING DEVICE WITH PARASITIC CAPACITANCE SUPPRESSING SIGNAL AND DRIVING METHOD THEREOF

(71) Applicant: LG Display Co., Ltd., Seoul (KR)

(72) Inventors: Dukhyo Lee, Seoul (KR); Beomjin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 250 days.

(21) Appl. No.: 14/585,515

(22) Filed: Dec. 30, 2014

(65) Prior Publication Data

US 2016/0092027 A1    Mar. 31, 2016

(30) Foreign Application Priority Data

Sep. 26, 2014  (KR) .................. 10-2014-0129607

(51) Int. Cl.
*G06F 3/044* (2006.01)
*G06F 3/041* (2006.01)
*G02F 1/1333* (2006.01)

(52) U.S. Cl.
CPC .......... *G06F 3/044* (2013.01); *G02F 1/13338* (2013.01); *G06F 3/0412* (2013.01); *G06F 3/0416* (2013.01)

(58) Field of Classification Search
CPC ...... G06F 3/041; G06F 3/0412; G06F 3/0416; G06F 3/0418; G06F 3/044; G06F 2203/04107; G02F 1/13338; G09G 3/3655; G09G 3/3674; G09G 3/3685; G09G 3/3696; G09G 3/3677; G09G 2330/06

See application file for complete search history.

(56) References Cited

U.S. PATENT DOCUMENTS

| 2010/0253638 | A1* | 10/2010 | Yousefpor | G06F 3/0412 345/173 |
|---|---|---|---|---|
| 2011/0102360 | A1* | 5/2011 | Chen | G06F 3/0412 345/173 |
| 2011/0242050 | A1* | 10/2011 | Byun | G06F 3/044 345/174 |
| 2012/0092288 | A1* | 4/2012 | Wadia | G06F 3/044 345/174 |
| 2012/0162088 | A1* | 6/2012 | van Lieshout | G06F 3/0412 345/173 |
| 2012/0162133 | A1* | 6/2012 | Chen | G06F 3/0418 345/174 |
| 2012/0182251 | A1* | 7/2012 | Krah | G06F 3/0412 345/174 |
| 2013/0321296 | A1* | 12/2013 | Lee | G06F 3/041 345/173 |

(Continued)

*Primary Examiner* — Keith Crawley
(74) *Attorney, Agent, or Firm* — Fenwick & West LLP

(57) ABSTRACT

A touch sensing device includes a panel including pixels disposed in a matrix form defined by data lines and gate lines, the pixels including thin film transistors (TFTs). The touch sensing device includes at least one touch sensor having a mutual capacitance and a sensor driving circuit configured to receive an electric charge from the mutual capacitance. The touch sensing device further includes a display driving circuit configured to supply a first parasitic capacitance suppressing signal to the data lines and a second parasitic capacitance suppressing signal to the gate lines during a touch sensor driving period.

16 Claims, 14 Drawing Sheets

(56) References Cited

U.S. PATENT DOCUMENTS

2014/0145997 A1* 5/2014 Tiruvuru .............. G06F 3/044
                                                   345/174
2015/0091843 A1* 4/2015 Ludden ............... G06F 3/044
                                                   345/174
2015/0091850 A1* 4/2015 Morein ............... G06F 3/0412
                                                   345/174

* cited by examiner

TOUCH SENSING DEVICE WITH PARASITIC CAPACITANCE SUPPRESSING SIGNAL AND DRIVING METHOD THEREOF

The present invention claims the benefit of Korean Patent Application No. 10-2014-0129607 filed in Korea on Sep. 26, 2014, the entire contents of which is incorporated herein by reference for all purposes as if fully set forth herein.

BACKGROUND OF THE INVENTION

Field of the Invention

The present invention relates to a touch sensing device and a driving method thereof, and more particularly to a touch sensing device in which touch sensors are embedded in a pixel array, and a driving method thereof.

Discussion of the Related Art

User interfaces (UIs) allow human beings (users) to communicate with various electric and electronic devices to easily control them as intended. Typical user interfaces include a keypad, a keyboard, a mouse, an on-screen display (OSD), a remote controller having an infrared communication or radio frequency (RF) communication function, and the like. UI technologies are advancing toward enhancement of user emotion and operational convenience. Recently, UIs have evolved to a touch UI, a voice recognition UI, a 3D UI, and the like.

The touch UI is often employed in portable information devices such as smartphones and is increasingly applied to notebook computers, computer monitors, home appliances, and the like. Recently, a technique of embedding touch sensors in a pixel array of a display panel (hereinafter, referred to as an "in-cell touch sensor") has been proposed. According to the in-cell touch sensor technique, touch sensors may be installed in a display panel without increasing the thickness of the display panel. The touch sensors are connected to pixels through parasitic capacitances and signal lines (hereinafter, referred to as "pixel signal lines"). As for a driving method thereof, a period during which pixels are driven (hereinafter, referred to as a "display driving period") and a period for driving touch sensors (hereinafter, referred to as a "touch sensor driving period") are temporally divided in order to reduce a mutual influence due to coupling between the pixels and the touch sensors.

In the in-cell touch sensor technique, electrodes connected to pixels of a display panel are utilized as electrodes of the touch sensors. For example, the in-cell touch sensor technique may include a method of dividing a common electrode, for supplying a common voltage to pixels of a liquid crystal display, for use as an electrode of the touch sensors.

As an example of a capacitance-type touch sensor that can be implemented as an in-cell touch sensor, a mutual capacitance-type touch sensor (hereinafter, referred to as a "touch sensor") has been known.

FIGS. 1 and 2 are a plan view illustrating an electrode pattern of a touch sensor and an equivalent circuit diagram of the touch sensor, respectively.

As shown in FIGS. 1 and 2, a mutual capacitance-type touch screen includes transmission (Tx) lines Tx1 to Tx4 and reception (Rx) lines Rx1 to Rx4 intersecting the Tx lines Tx1 to Tx4 with dielectric materials (or insulating layers) interposed therebetween. A mutual capacitance Cm is formed between the Tx lines Tx1 to Tx4 and the Rx lines Rx1 to Rx4. When a touch driving signal (or a stimulating signal) is supplied to the Tx lines Tx1 to Tx4, electric charges are charged in the mutual capacitance Cm. A sensing circuit senses a touch input based on the amount of change in electric charges of the mutual capacitance Cm before and after the touch.

In FIG. 2, R(Tx) is a resistor of a Tx line, R(Rx) is a resistor of an Rx line, C(Tx) is a parasitic capacitance of the Tx line, and C(Rx) is a parasitic capacitance of the Rx line.

When touch sensors are embedded in a pixel array, a large amount of parasitic capacitances affecting the touch sensors due to coupling between the touch sensors and pixel signal lines is added. The pixel signal lines are signal lines for writing data to pixels. In FIG. 3, pixel signal lines include a data line DL for supplying a data voltage to pixels and a gate line GL supplying a gate pulse (or a scan pulse) for selecting data-written pixels. In FIG. 3, Cfinger is a capacitance equivalently expressing a finger when the finger applies a touch. Clc is a capacitance equivalently expressing a liquid crystal cell. Cdg is a parasitic capacitance between the gate line GL and the data line DL, and Cgs is a parasitic capacitance between a gate and a source of a thin film transistor (TFT).

Parasitic capacitances connected to in-cell touch sensors include Ctd, Ctg, Ctc, Cgc, Cdc, and the like, as shown in FIG. 3. Ctd is a parasitic capacitance between the Tx line and the data line DL, Ctg is a parasitic capacitance between the Tx line and the gate line GL, Ctc is a parasitic capacitance between the Tx line and the Rx line, Cgc is a parasitic capacitance between the Rx line and the gate line GL, and Cdc is a parasitic capacitance between the Rx line and the data line DL. As a size of a touch screen employing in-cell touch sensors increases and resolution thereof increases, the touch sensitivity and touch recognition accuracy declines due to parasitic capacitances connected to the in-cell touch sensors. Thus, in order to apply the in-cell touch sensor technology to touch screens of a large-screen display device, the parasitic capacitance of touch sensors needs to be reduced or minimized.

FIG. 4 is a waveforms illustrating driving signals of a display device, such as that the one illustrated in FIG. 3.

As shown in FIG. 4, in order to drive a display device including in-cell touch sensors, a display driving period Td and a touch sensor driving period Tt are temporally divided. During the display driving period Td, a data voltage Vdata and a gate pulse GP are generated to write data to pixels. The gate pulse GP is swung between a gate high voltage VGH and a gate low voltage VGL. During the display driving period Td, Tx lines and Rx lines of touch sensors serve as a common electrode supplying a common voltage Vcom to the pixels. During the touch sensor driving period Tt, a voltage of the data lines DL is held at the final data voltage of the previous display driving period Td and a voltage of the gate lines GL is held at a gate low voltage VGL. During the touch sensor driving period Td, a touch driving signal Tdrv is supplied to the Tx lines. During the touch sensor driving period Td, the sensing circuit is in synchronization with the touch driving signal Tdrv and senses a variation in electric charges of the touch sensors through the Rx lines.

SUMMARY OF THE INVENTION

Accordingly, the present invention is directed to a touch sensing device and a driving method thereof that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensing device includes: a panel including pixels disposed in a matrix form defined by data lines and gate lines, the pixels including thin film transistors (TFTs); at least one touch sensor having a mutual capacitance; a sensor driving circuit configured to receive an electric charge from the mutual capacitance; and a display driving circuit configured to supply a first parasitic capacitance suppressing signal to the data lines and a second parasitic capacitance suppressing signal to the gate lines during a touch sensor driving period.

In another aspect, a touch screen display device includes: a display panel including at least one touch sensor having a mutual capacitance and pixels disposed in a matrix form defined by data lines and gate lines, the pixels including thin film transistors (TFTs); a sensor driving circuit configured to receive an electric charge from the mutual capacitance; and a display driving circuit configured to supply a data voltage of an input image to the data lines and a gate pulse to the gate lines during a display driving period, and to supply a first parasitic capacitance suppressing signal to the data lines and a second parasitic capacitance suppressing signal to the gate lines during a touch sensor driving period.

In yet another aspect, a method of driving a touch sensing device having a panel with at least one touch sensor and pixels disposed in a matrix form defined by data lines and gate lines is disclosed. The method includes: supplying a first parasitic capacitance suppressing signal to the data lines and a second parasitic capacitance suppressing signal to the gate lines; determining a remaining amount of electric charge in the panel; and if the remaining amount of electric charge exceeds a threshold amount, modifying a voltage level of at least one of the first and second parasitic capacitance suppressing signals based on the remaining parasitic capacitance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXAMPLE EMBODIMENTS

Figure 1:
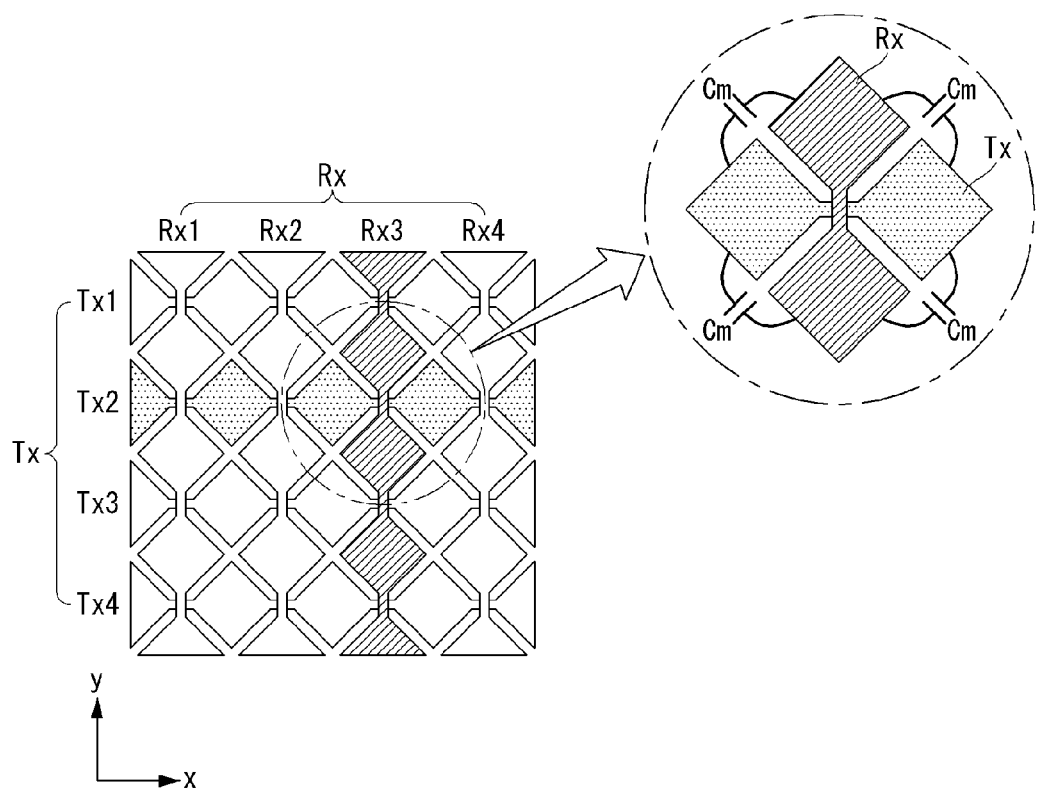
FIG. 1 is an enlarged plan view of an electrode pattern of a mutual capacitance-type touch sensor.
Figure 2:
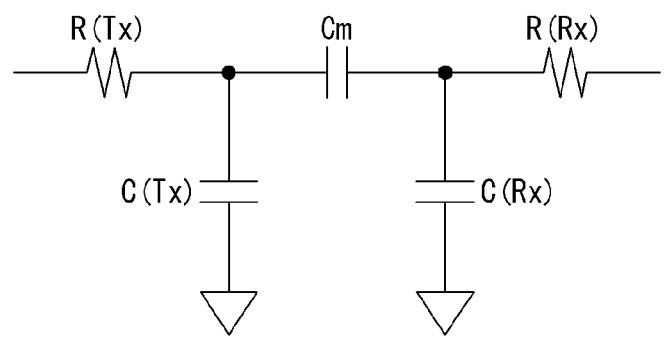
FIG. 2 is an equivalent circuit diagram of the touch sensor illustrated in FIG. 1.
Figure 3:
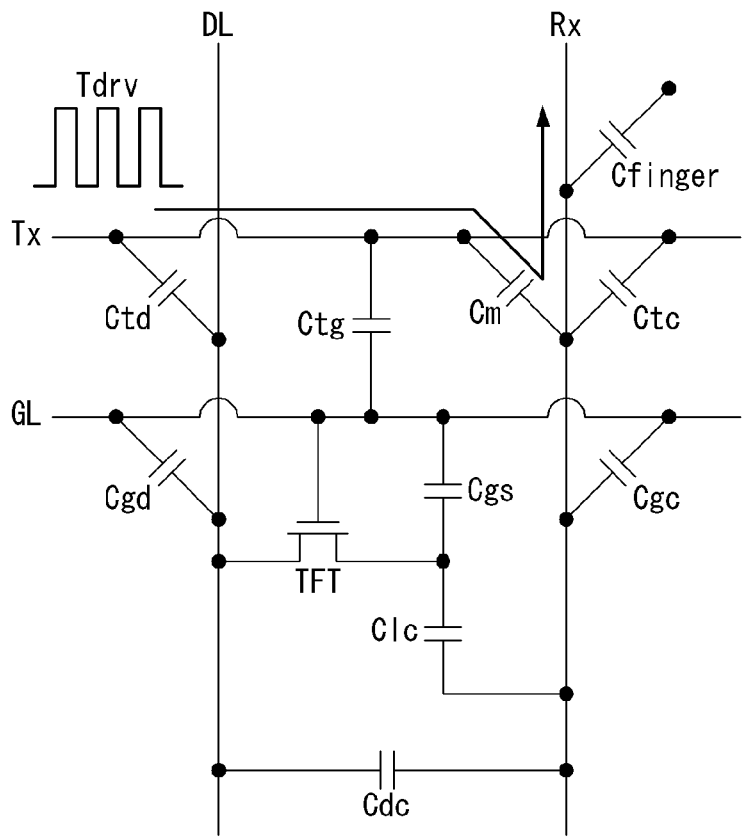
FIG. 3 is a circuit diagram illustrating parasitic capacitances between in-cell touch sensors and pixels formed in a display device.
Figure 4:
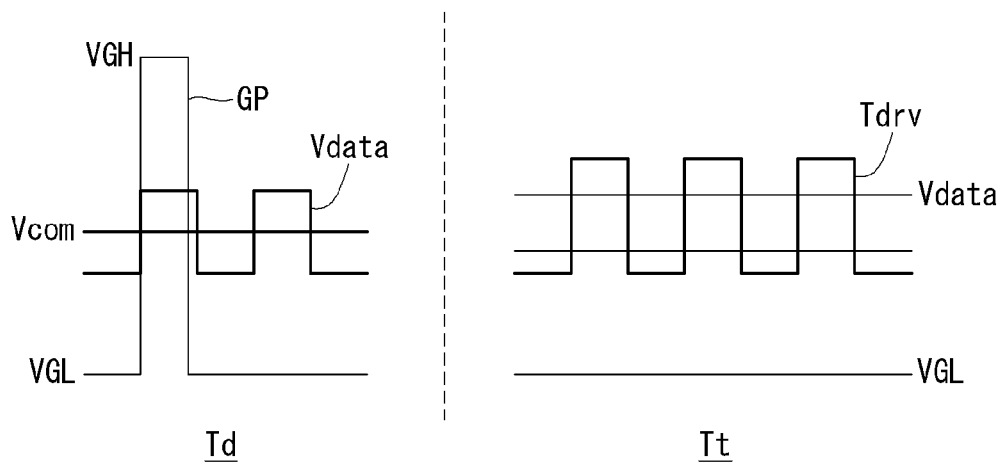
FIG. 4 is a waveform illustrating driving signals of the display device of FIG. 3.

Reference will now be made in detail to the embodiments of the present invention, examples of which are illustrated in the accompanying drawings. Throughout the specification, like reference numerals refer to like elements.

Names of elements used in the following description are selected for the description purpose and may be different from those of actual products.

A display device according to an example embodiment of the present invention may be implemented as a flat display device such as a liquid crystal display (LCD), a field emission display (FED), a plasma display panel (PDP), an organic light emitting display (OLED), an electrophoresis display (EPD), and the like. In the embodiments described hereinafter, a liquid crystal display (LCD) will be largely described as an example of a flat display device, but the present invention is not limited thereto. For example, the display device according to example embodiments of the present invention may be applied to any display device to which an in-cell touch sensor technology is applicable.

A touch sensing device according to an example embodiment of the present invention includes a plurality of touch sensors embedded in a pixel array by dividing a common electrode supplying a common voltage to pixels. In order to minimize an influence of parasitic capacitances connected to in-cell touch sensors, an alternating current (AC) signal in phase with a touch driving signal is supplied to pixel signal lines. Also, an AC signal in phase with a touch driving signal may be applied to Rx lines.

A common voltage Vcom applied to the pixels of the LCD is illustrated as a common voltage in example embodiments described hereinafter, but the present invention is not limited thereto. For example, the common voltage may be interpreted as a voltage commonly supplied to pixels of a flat display device, such as high potential/low potential source voltages (VDD/VSS), or the like, commonly applied to pixels of an organic light emitting diode display device.

In the touch sensing device according to example embodiments of the present invention, in a state in which sensor electrodes are connected by short-circuiting touch sensors during a display driving period by using switching elements, a common voltage Vcom may be supplied to the pixels through the connected sensor electrodes. In the touch sensing device according to example embodiments of the present invention, in a state in which the touch sensors are separated by turning off switching elements during a touch sensor driving period, a touch driving signal may be supplied to the touch sensors.

Figure 5:
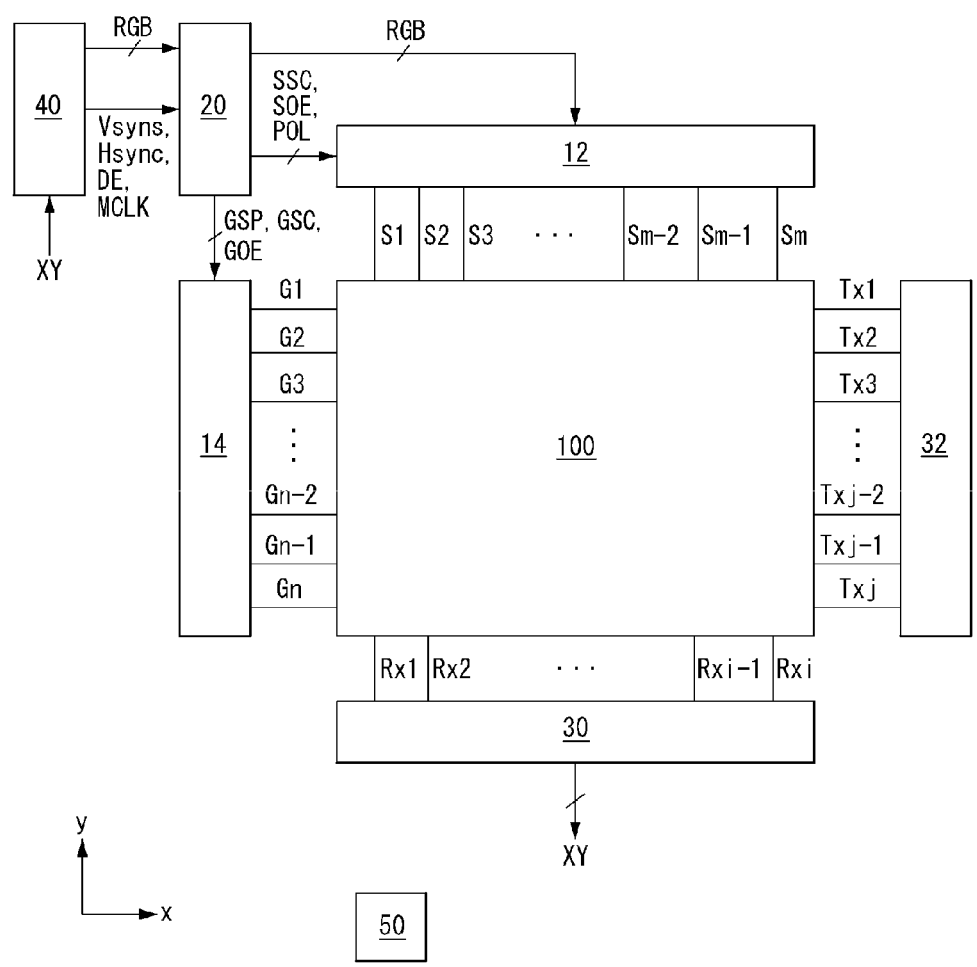
FIG. 5 is a block diagram schematically illustrating a display device according to a first example embodiment of the present invention.
Figure 6:
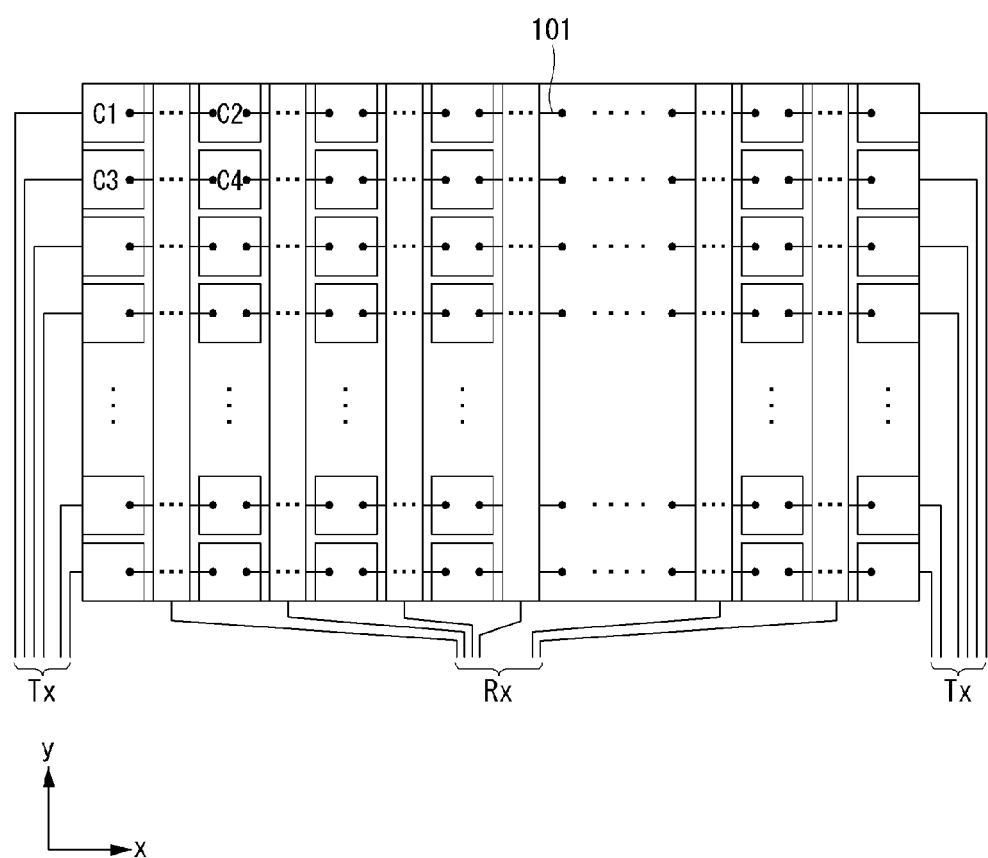
FIG. 6 is a plan view illustrating a structure of a touch screen including mutual capacitance touch sensors according to an example embodiment of the present invention.
Figure 7:
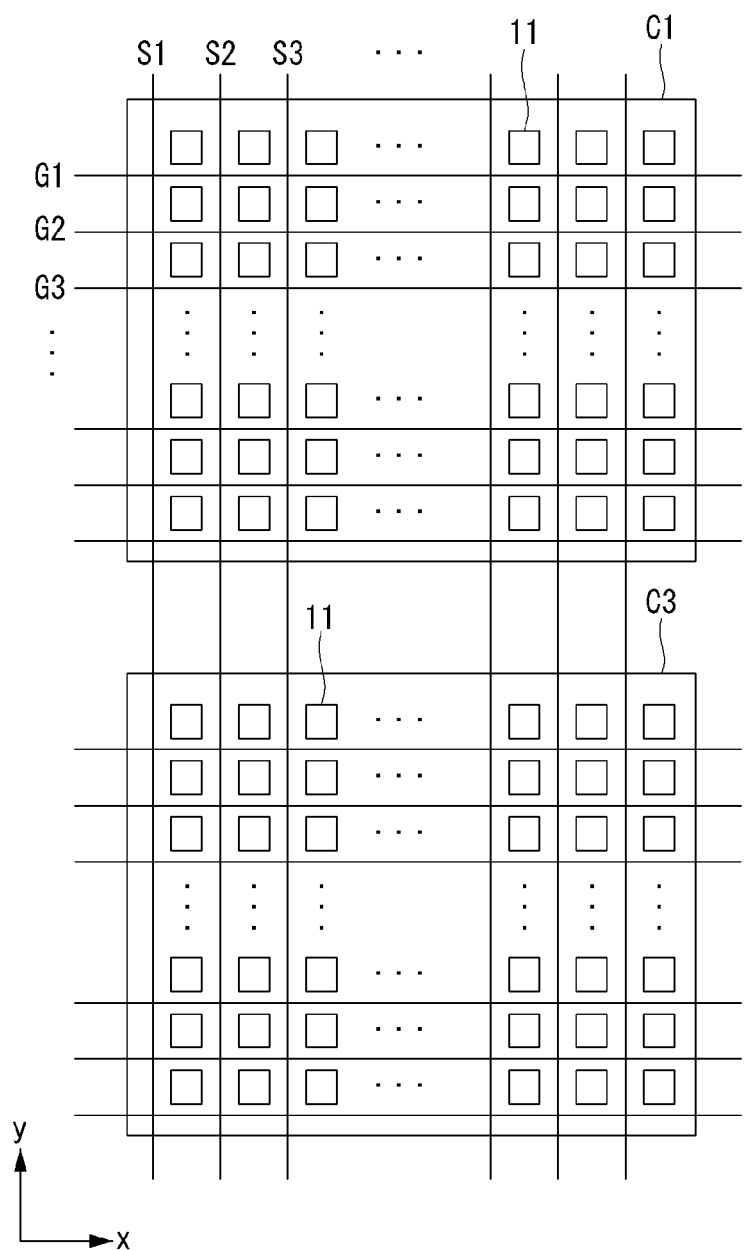
FIG. 7 is a view illustrating sensor electrodes connected to a plurality of pixels according to an example embodiment of the present invention.
Figure 8:
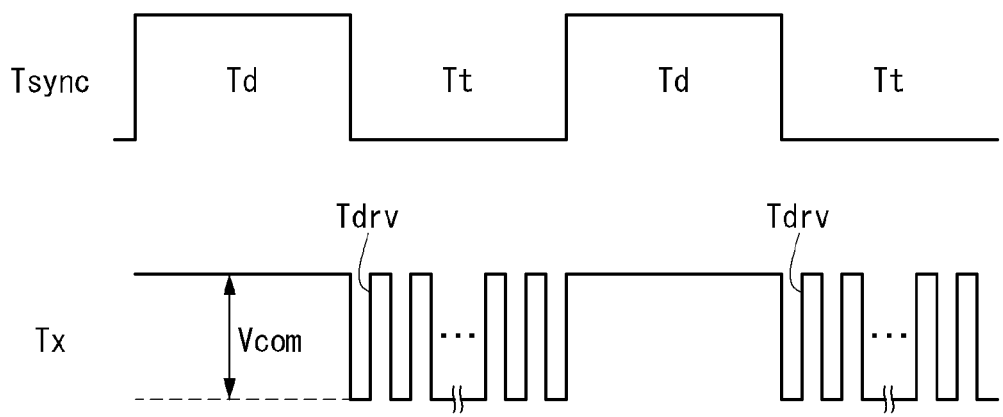
FIG. 8 is a waveform view illustrating a method of time division driving of pixels and touch sensors according to an example embodiment of the present invention.

FIGS. 5 and 6 are block diagrams schematically illustrating a display device and touch sensors according to a first example embodiment of the present invention. FIG. 7 is a view illustrating sensor electrodes connected to a plurality of pixels according to the first example embodiment of the present invention. FIG. 8 is a waveform view illustrating a method of time division driving of pixels and touch sensors according to the first example embodiment of the present invention.

As shown in FIGS. 5 through 8, the display device according to the first example embodiment of the present invention includes a touch sensing device. The touch sensing device senses a touch input by using touch sensors embedded in a display panel 100.

The pixels are disposed in a matrix form defined by data lines S1 to Sm (or DL1 to DLm) and gate lines G1 to Gn (or GL1 to GLn). Each of the pixels includes a pixel TFT formed at a crossing of the data lines S1 to Sm and the gate lines G1 to Gn, a pixel electrode receiving a data voltage through the pixel TFT, a common electrode to which a common voltage Vcom is applied, a storage capacitor Cst connected to the pixel electrode to hold a voltage of a liquid crystal cell, and the like. A common electrode is separated from a plurality of touch sensors during the touch sensor driving period.

In the LCD device, a liquid crystal layer is formed between two substrates of a display panel 100. Liquid crystal molecules of the liquid crystal layer are driven by an electric field generated due to a potential difference between a data voltage applied to the pixel electrode and the common voltage applied to the common electrode. The pixel array of the display panel 100 includes pixels defined by data lines S1 to Sm (m is a positive integer equal to or greater than 2) and gate lines G1 to Gn (n is a positive integer equal to or greater than 2), and touch sensors divided from the common electrode connected to the pixels. The touch sensors include Tx lines Tx1 to Txj (j is a positive integer smaller than n), Rx lines Rx1 to Rxi (i is a positive integer smaller than m) intersecting the Tx lines Tx1 to Txj, and a mutual capacitance Cm between the Tx lines Tx1 to Txj and the Rx lines Rx1 to Rxi.

The display device according to the first example embodiment of the present invention further includes display driving circuits 12 and 14, and a timing controller 20 for writing data of an input image to pixels, sensor driving circuits 30 and 32 driving the touch sensors, and a power supply unit 50 generating power.

The display driving circuits 12 and 14, the timing controller 20, and the sensor driving circuits 30 and 32 are synchronized in response to a synchronization signal Tsync. The display driving period Td and the touch sensor driving period Tt are temporally divided as illustrated in FIG. 8.

Figure 11:
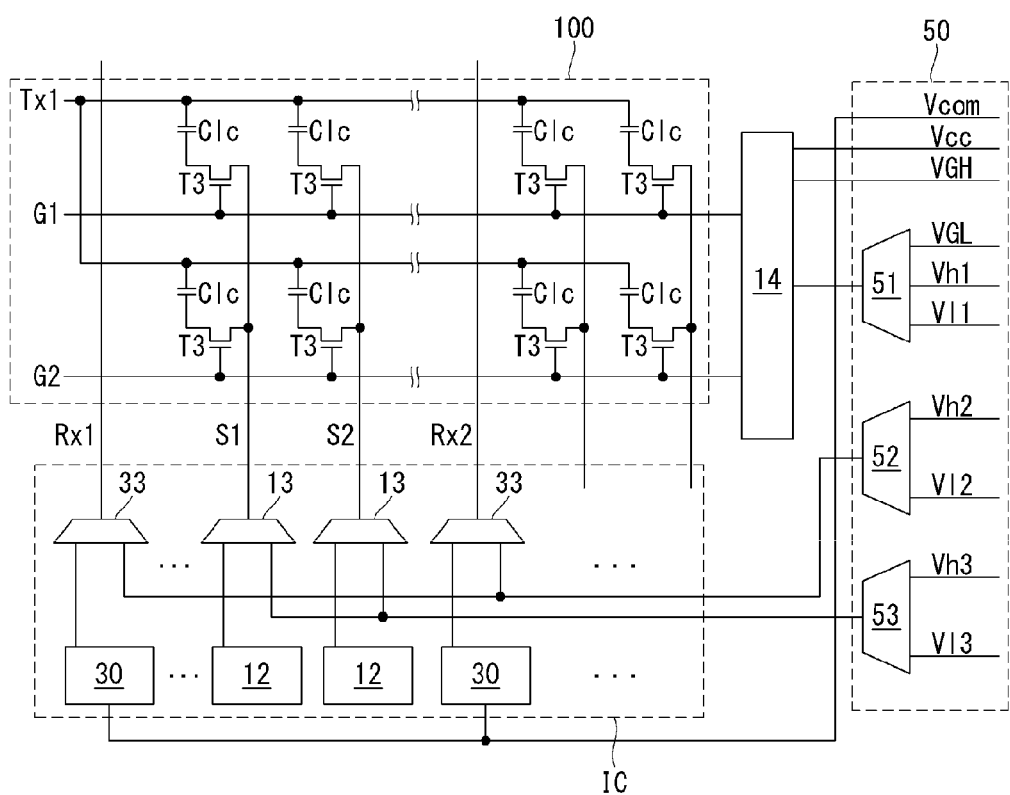
FIG. 11 is a detailed circuit diagram illustrating a driving circuit of a display device according to an embodiment of the present invention.
Figure 12:
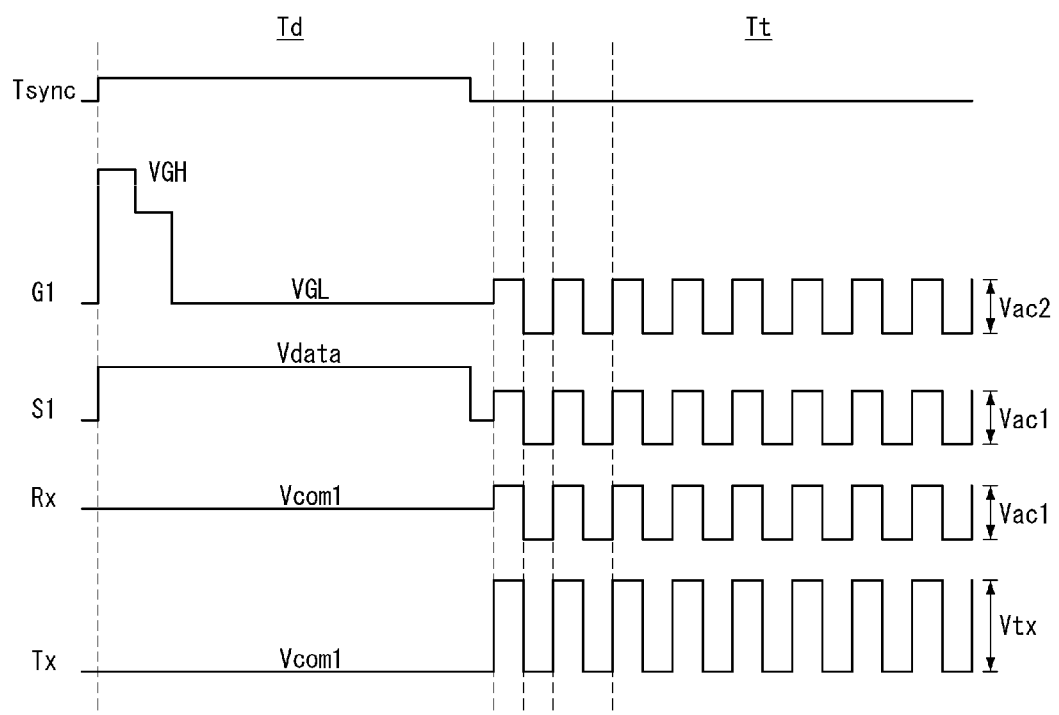
FIG. 12 is an example waveform illustrating a pixel driving signal and a touch driving signal output from the driving circuit of FIG. 11.

The display driving circuits 12 and 14, and the timing controller 20 write data to pixels during the display driving period Td. The display driving circuits 12 and 14, and the timing controller 20 supply an AC signal in phase with a touch driving signal Tdvr to the signal lines S1 to Sm and G1 to Gn during the touch sensor driving period Td as illustrated in FIGS. 11 and 12. The pixels hold a data voltage which has been charged during the display driving period because pixel TFTs are turned off during the touch sensor driving period Tt. In order to minimize parasitic capacitances between the touch sensors, and the pixel signal lines S1 to Sm and G1 to Gn during the touch sensor driving period Tt, the display driving circuit supplies first and second parasitic capacitance suppressing signals VLFD1 and VLFD2, AC signals in phase with a touch driving signal Tdrv to the pixel signal lines S1 to Sm and G1 to Gn.

The display driving circuits 12 and 14 include a data driving circuit 12 and a gate driving circuit 14. The data driving circuit 12 converts digital video data RGB of an input image received from the timing controller 20 into analog positive polarity/negative polarity gamma compensation voltages to output data voltages during the display driving period Td. The data voltages output from the data driving circuit 12 are supplied to the data lines S1 to Sm. The data driving unit 12 supplies the first parasitic capacitance suppressing signal VLFD1 to the data lines Si to Sm during the touch sensor driving period Tt. The first parasitic capacitance suppressing signal VLFD1 is in phase with the touch driving signal Tdrv applied to the touch sensors. The first parasitic capacitance suppressing signal VLFD1 changes voltages at both ends of the parasitic capacitance simultaneously to minimize an amount of electric charge charged in the parasitic capacitance. A voltage level of the first parasitic capacitance suppressing signal VLFD1 is formed to be lower than that of the touch driving signal Tdrv so that electric charges may be charged in the mutual capacitance.

During the display driving period Td, the gate driving circuit 14 sequentially supplies a gate pulse (or scan pulse) in synchronization with a data voltage to select a line of the display panel 100 to which the data voltages are written. The gate pulse is swung between a gate high voltage VGH and a gate low voltage VGL. The gate pulse is applied to the gates of the pixel TFTs through the gate lines G1 to Gn. The gate high voltage VGL is set to a voltage higher than a threshold voltage of the pixel TFTs to turn on the pixel TFTs. The gate low voltage VGL is a voltage lower than the threshold voltage of the pixel TFTs. During the touch sensor driving period Tt, the gate driving circuit 14 supplies the second parasitic capacitance suppressing signal VLFD2 to the gate lines G1 to Gn. The second parasitic capacitance suppressing signal VLFD2 is in phase with the touch driving signal Tdrv applied to the touch sensors. Thus, the parasitic capacitance between the touch sensors and the gate lines are minimized. The voltage of the AC signal applied to the gate lines G1 to Gn during the touch sensor driving period Tt should be lower than the gate high voltage VGH and lower than the threshold voltage of the pixel TFTs such that data written to the pixels may not be changed.

The timing controller 20 receives timing signals such as a vertical synchronization signal Vsync, a horizontal synchronization signal Hsync, a data enable (DE) signal, a main clock MCLK, and the like, from a host system 40. The timing controller 20 synchronizes an operation timing of the data driving circuit 12 and the gate driving circuit 14. The timing controller 20 may output scan timing signals, including a gate start pulse (GSP), a gate shift clock (GSC), a gate output enable (GOE) signal, and the like. The timing controller 20 may also output data timing control signals, including a source sampling clock (SSC), a polarity (POL) control signal, a source output enable (SOE) signal, and the like.

The host system 40 may be implemented as any one of a television system, a set-top box (STB), a navigation system, a DVD player, a Blu-ray player, a personal computer (PC), a home theater system, a phone system, and other systems incorporating or in use with a display. The host system 40, including a system-on-chip (SoC) with a scaler embedded therein, converts digital video data of an input image into a format appropriate for the resolution of the display panel 100. The host system 40 transmits the timing signals (e.g., Vsync, Hsync, DE, and MCLK), together with the digital video data RGB of the input image, to the timing controller 20. Also, the host system 40 executes an application program associated with coordinate information (XY) of a touch input from the sensing circuit 30.

The timing controller 20 or the host system 40 may generate a synchronization signal for synchronizing the display driving circuits 12 and 14, the timing controller 20, and the sensing circuit 30.

The Tx lines Tx1 to Txj and the Rx lines Rx1 to Rxi may receive the common voltage Vcom during the display driving period Td. The touch driving signal Tdrv is supplied to the Tx lines Tx1 to Txj during the touch sensor driving period Td. The Tx lines Tx1 to Txj and the Rx lines Rx1 to Rxi are connected to pixels through parasitic capacitances and pixel signal lines.

Sensor electrodes (e.g., C1 and C2) of a Tx line adjacent in a transverse direction (x-axis direction) may be connected through a bridge pattern 101 in the pixel array or may be connected through routing lines (not shown) formed in a bezel region outside the pixel array. The bridge pattern 101 connects the sensor electrodes C1 and C2 of the Tx line, which are spaced apart from one another between Rx lines through an insulating layer.

In FIG. 7, reference numeral 11 denotes a pixel electrode. The Tx lines Tx1 to Txj include sensor electrodes (e.g., C1 to C4) connected in the transverse direction (X-axis direction). Each of the sensor electrodes C1 to C4 are patterned to have a size greater than that of a pixel and are connected to a plurality of pixels. Each of the sensor electrodes C1 to C4 may be formed of a transparent conductive material, for example, indium tin oxide (ITO). The Rx lines Rx1 to Rxi may also be formed of ITO. In order to compensate for resistance of ITO, metal lines formed of a low-resistivity metal, for example, Cu, AlNd, Mo, Ti, and the like, may be connected to the Tx lines Tx1 to Txj and the Rx lines Rx1 to Rxi, respectively.

The sensor driving circuits 30 and 32 include a sensing circuit 30 and a Tx driving circuit 32. The sensor driving circuits 30 and 32 may supply the common voltage Vcom of pixels to the Tx lines Tx1 to Txj and the Rx lines Rx1 to Rxi during the display driving period Td. The sensor driving circuits 30 and 32 supply the touch driving signal Tdrv to the Tx lines Tx1 to Txj and receive electric charges from the mutual capacitance Cm through the Rx lines Rx1 to Rxi during the touch sensor driving period Td.

After supplying the common voltage Vcom to the Tx lines Tx1 to Txj during the display driving period, the Tx driving circuit 32 supplies the touch driving signal Tdrv to the Tx lines Tx1 to Txj during the touch sensor driving period Tt. The Tx driving circuit 32 may sequentially shift the touch driving signal Tdrv. In this case, the data driving circuit 12, the gate driving circuit 14, and the sensing circuit 30 may be synchronized to shift an AC signal in phase with the touch driving signal Tdrv.

The sensing circuit 30 provides a third parasitic capacitance suppressing signal VLFD3 to the Rx lines Rx1 to Rxi during the touch sensor driving period Tt. The third parasitic capacitance suppressing signal VLFD3 is in phase with the touch driving signal Tdrv. During the touch sensor driving period Tt, the sensing circuit 30 compares the amount of change in electric charges of the touch sensors with a predetermined threshold value and senses a change in capacitance greater than the threshold value, as a touch input. The sensing circuit 30 generates coordinate information (XY) indicating a position and an area of each touch input and transmits the generated coordinate information to the host system 40.

As illustrated in FIG. 11, the data driving circuit 12, and the sensor driving circuits 30 and 32 may be integrated in a single integrated circuit (IC) and bonded to a substrate of the display panel through a chip-on-glass (COG) process.

The power supply unit 50 supplies the common voltage Vcom to the touch sensors during the display driving period Td. The power supply unit 50 generates power such as a gate high voltage VGH, a gate low voltage VGL, a gamma reference voltage, a logic source voltage Vcc for driving the timing controller 20, the driving circuits 12, 14, and 32, the sensing circuit 30, and the like. The analog positive polarity/negative polarity gamma compensation voltage is determined based on the gamma reference voltage. The power supply unit 50 generates an AC signal voltage in phase with the touch driving signal Tdrv during the touch sensor driving period Tt.

Figure 9:
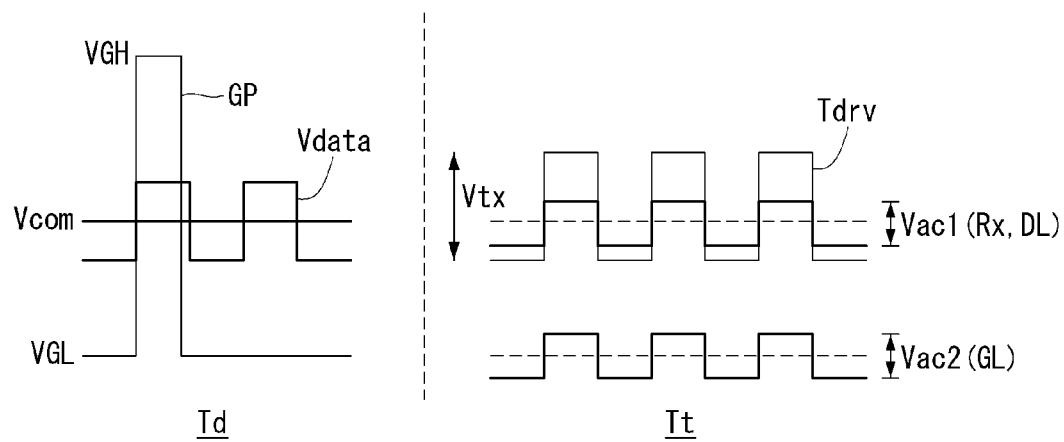
FIGS. 9 and 10 are views illustrating a driving method of a touch sensing device according to an example embodiment of the present invention.
Figure 10:
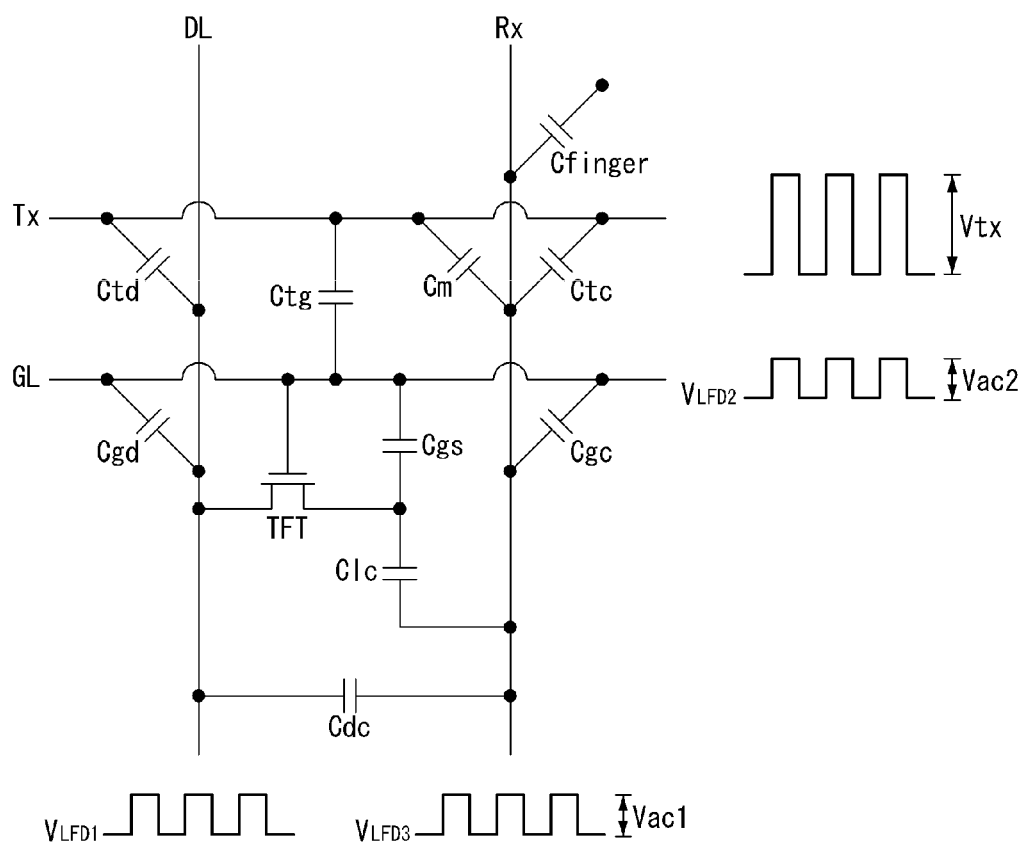

FIGS. 9 and 10 are views illustrating a driving method of a touch sensing device according to an example embodiment of the present invention.

As shown in FIGS. 9 and 10, during the touch sensor driving period Tt, data is written to pixels. During the display driving period Td, the common voltage Vcom is supplied to the pixels through the Tx lines Tx1 to Txj and the Rx lines Rx1 to Rxi. During the touch sensor driving period Tt, the touch driving signal Tdrv is supplied to the Tx lines Tx1 to Txj, and electrical charges of the mutual capacitance Cm are received through the Rx lines Rx1 to Rxi in synchronization with the touch driving signal Tdrv.

During the touch sensor driving period Tt, an AC signal in phase with the touch driving signal Tdrv is supplied to the pixel signal lines in order to minimize parasitic capacitances connected to the touch sensors. The AC signal may also be supplied to the Rx lines Rx1 to Rxi. In order for electric charges to be charged in the mutual capacitance Cm, there should be a potential difference between the Tx lines and the Rx lines. Thus, a voltage Vtx of the touch driving signal Tdrv should be higher than voltages Vac1 and Vac2 of the AC signals respectively applied to the pixel signal lines DL and GL, and the Rx lines.

FIG. 11 is a detailed circuit diagram illustrating the driving circuit of the display device according to an embodiment of the present invention. FIG. 12 is an example waveform illustrating a pixel driving signal and a touch driving signal output from the driving circuit of FIG. 11. In FIG. 11, Clc denotes a liquid crystal cell, and T3 denotes a pixel TFT. In FIG. 11, the driving circuit is illustrated mainly based on a circuit that generates an AC signal in phase with the touch driving signal Tdrv. The Tx driving circuit 32 is omitted in the illustration.

As shown in FIGS. 11 and 12, the power supply unit 50 generates the common voltage Vcom, the logic source voltage Vcc, the gate high voltage VGH, the gate low voltage VGL, parasitic capacitance suppressing signal voltages Vh1 to Vh3 and Vl1 to Vl3, and the like. The logic source voltage Vcc is driving voltage of the gate driving circuit 14 and the IC.

The power supply unit 50 includes a plurality of multiplexers 51 to 53. A first multiplexer 51 selectively supplies a gate low voltage VGL1, and parasitic capacitance suppressing voltages Vh1 and Vl1 to the gate driving circuit 14 in response to a first select signal. A second multiplexer 52 selectively outputs parasitic capacitance suppressing voltages Vh2 and Vl2 in response to a second select signal. A third multiplexer 53 selectively outputs parasitic capacitance suppressing voltages Vh3 and Vl3 in response to a third select signal. The parasitic capacitance suppressing voltages are swung between the high potential voltages Vh1 to Vh3 and the low potential voltages Vl1 to Vl3.

The gate high voltage VGH and the gate low voltage VGL are supplied to the gate lines (e.g., G1 and G2) through the gate driving circuit 14. The gate driving circuit 14 sequentially shifts an output waveform by using a shift register. In response to a gate start pulse GSP, the shift register outputs a gate shift clock GSC and shifts the output. An AC signal output from the power supply unit 50 is a gate shift clock, which is input to the shift register.

During the display driving period Td, the gate driving circuit 14 supplies a gate pulse swung between the VGH and the VGL to the gate lines G1 and G2. During the touch sensor driving period Tt, the gate driving circuit 14 supplies the second parasitic capacitance suppressing signal VLFD2 swung between the voltages Vh1 and Vl1 in synchronization with the touch driving signal Tdrv to the gate lines G1 and G2. Vh1 is lower than VGH and lower than a threshold voltage of the pixel TFTs T3.

During the display driving period Td, the IC supplies the common voltage Vcom input from the power supply unit 50 to the Tx lines Tx1 to Txj and the Rx lines Rx1 to Rxi. During the touch sensor driving period Tt, the IC supplies the touch driving signal Tdrv to the Tx lines Tx1 to Txj and supplies the first to third parasitic capacitance suppressing signals VLFD1, VLFD2, and VLFD3 received from the power supply unit 50 to the pixel signal lines S1 to Sm and G1 to Gn, and the Rx lines Rx1 to Rxi, respectively.

The IC includes a plurality of multiplexers 13 and 33 coupled to the data driver 12 and the sensing circuit 30, respectively. Fourth multiplexers 33 each include an output terminal connected to a respective one of the Rx lines Rx1 to Rxi and input terminals respectively connected to the sensing circuit 30 and the second multiplexer 52. In response to a fourth select signal, the fourth multiplexers 33 supply the common voltage Vcom input from the sensing circuit 30 to the Rx lines Rx1 to Rxi during the display driving period Td. The fourth multiplexers 33 supply the third parasitic capacitance suppressing signal VLFD3 supplied through the second multiplexer 52 to the Rx lines Rx1 to Rxi during the touch sensor driving period Tt. During the touch sensor driving period Tt, the sensing circuit 30 receives electric charges of the mutual capacitance Cm through the Rx lines Rx1 to Rxi to which the third parasitic capacitance suppressing signal VLFD3 is supplied and the fourth multiplexers 33.

Fifth multiplexers 13 each include an output terminal connected to a respective one of the data lines DL1 to DLn and input terminals respectively connected to the data driving circuit 12 and the third multiplexer 53. During the display driving period Td, in response to a fifth select signal, the fifth multiplexers 13 supply a data voltage of an input image output from the data driving circuit 12 to the data lines DL1 to DLm. Thereafter, during the touch sensor driving period Tt, the fifth multiplexers 13 supply an AC signal to the data lines DL1 to DLm.

The timing controller 20 or a micro-controller unit (MCU) of the sensing circuit 30 may generate select signals for controlling the first to fifth multiplexers 51, 52, 53, 13, and 33.

As discussed above, the touch sensing device according to an example embodiment of the present invention can minimize parasitic capacitance present in the panel by using the first to third parasitic capacitance suppressing signals VLFD1 to VLFD3 respectively provided to the data lines S1 to Ln (or DL1 to DLn), the gate lines G1 to Gm (or GL1 to GLm), and the Rx lines Rx1 to Rxi during the touch sensor driving period Td. Preferably, the first to third parasitic capacitance suppressing signals VLFD1 to VLFD3 should make parasitic capacitances present in the panel 'zero'. However, due to the panel characteristics, a reduced amount of parasitic capacitances may still remain in the panel even after the first to third parasitic capacitance suppressing signals VLFD1 to VLFD3 are applied.

Thus, in order to exclude an influence of parasitic capacitances that remain in the panel even after the use of the first to third parasitic capacitance suppressing signals VLFD1 to VLFD3, the touch sensing device according to an example embodiment of the present invention varies a voltage level of the parasitic capacitance suppressing signal VLFD.

Figure 13:
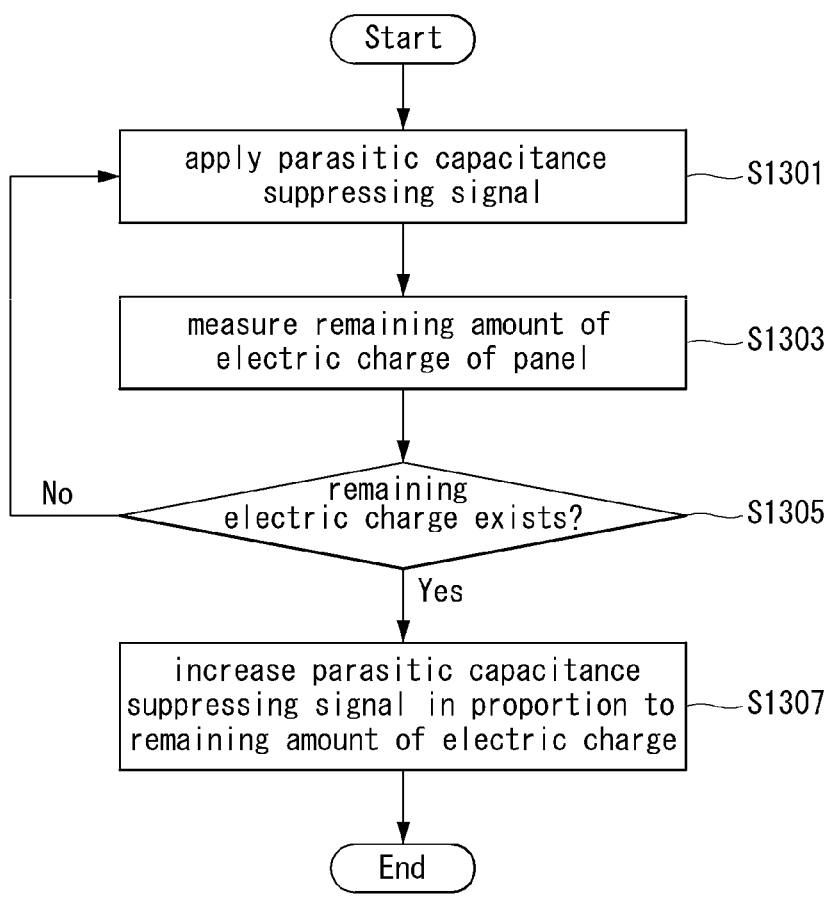
FIG. 13 is a flow chart illustrating a process of generating a parasitic capacitance suppressing signal according to an example embodiment of the present invention.
Figure 14:
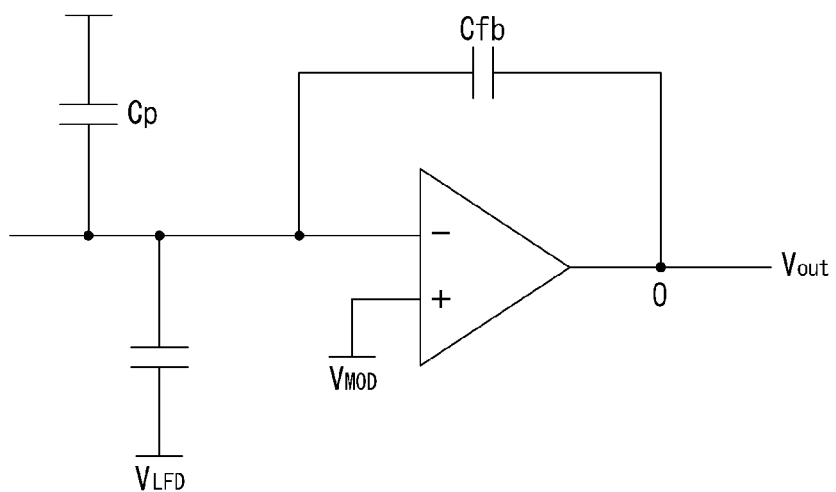
FIG. 14 is a circuit diagram illustrating an example embodiment of a sensing circuit.

FIG. 13 is a flow chart illustrating an example process of setting a voltage level of a parasitic capacitance suppressing signal VLFD, and FIG. 14 is a view illustrating an example sensing circuit according to an embodiment of the present invention. A process of setting a voltage level of the parasitic capacitance suppressing signal VLFD according to an example embodiment of the present invention will be described with reference to FIGS. 5 through 14.

In order to set a voltage level of the parasitic capacitance suppressing signal VLFD, the display driving circuits 12, 14, and 20 provides first to third parasitic capacitance suppressing signals VLFD1 to VLFD3 to the pixel lines, respectively. Namely, the display driving circuits 12 and 14, and the timing controller 20 provide the first parasitic capacitance suppressing signal VLFD1 to the data lines S1 to Sm, the second parasitic capacitance suppressing signal VLFD2 to the gate lines G1 to Gn, and the third parasitic capacitance suppressing signal VLFD3 to the Rx lines Rx1 to Rxi. All of the first to third parasitic capacitance suppressing signals VLFD1 to VLFD3 have an identical voltage level, before their voltage levels are corrected.

The sensing circuit 30 calculates parasitic capacitances remaining in the panel based on a change in an output value according to the first to third parasitic capacitance suppressing signals VLFD1 to VLFD3. The sensing circuit 30 may include an integrator such as the one illustrated in FIG. 14. The integrator may receive a reference voltage $V_{MOD}$, and outputs an output value increased in proportion to parasitic capacitance, to an output terminal O. An output Vout output by the integrator is expressed as Equation 1 below.

$$Vout = (Cp/Cf) \times V_{MOD} \quad \quad \text{[Equation 1]}$$

Here, Cp denotes the panel capacitance based on the parasitic capacitance suppressing signals, Cf denotes the overall capacitance of the panel, and $V_{MOD}$ denotes the reference voltage input to the integrator. The reference voltage $V_{MOD}$ is an AC signal in phase with the first to third parasitic capacitance suppressing signals VLFD1 to VLFD3.

As mentioned above, preferably, parasitic capacitances remaining in the panel should be removed when the first to third parasitic capacitance suppressing signals VLFD1 to VLFD3, and thus, the output value Vout should be 0. In other words, if the output value Vout is not 0, it means that parasitic capacitance remains in the panel even after the first to third parasitic capacitance suppressing signals VLFD1 to VLFD3 are applied.

If parasitic capacitance remains in the panel even after the first to third parasitic capacitance suppressing signals VLFD1 to VLFD3 are applied, it means that a relative potential of a portion corresponding to pixel lines to which the first to third parasitic capacitance suppressing signals VLFD1 to VLFD3 are provided, has been increased. Thus, in order to remove an influence of the parasitic capacitance remaining even after the first to third parasitic capacitance suppressing signals VLFD1 to VLFD3 are applied, the sensing circuit 30 increases voltage levels of the first to third parasitic capacitance suppressing signals VLFD1 to VLFD3 in proportion to the remaining parasitic capacitance.

For example, the sensing circuit 30 may set voltage levels of the first to third parasitic capacitance suppressing signals VLFD1 to VLFD3 to satisfy conditions of Equation 2 below.

$$\text{VLFDH} = V_{MOD} \times \{1 + (Cp\_r/Cp\_t)\} \quad \text{[Equation 2]}$$

Here, VLFDH denotes voltage levels of the first and second parasitic capacitance suppressing signals, $V_{MOD}$ denotes the reference voltage, Cp_r denotes a remaining parasitic capacitance of the panel, and Cp_t denotes a total parasitic capacitance of the panel.

In this manner, since the sensing circuit 30 increases the voltage levels of the first to third parasitic capacitance suppressing signals VLFD1 to VLFD3 in proportion to the remaining parasitic capacitance, an influence of the parasitic capacitance remaining even after the first to third parasitic capacitance suppressing signals VLFD1 to VLFD3 are applied, on the touch sensing process may be prevented.

Figure 15:
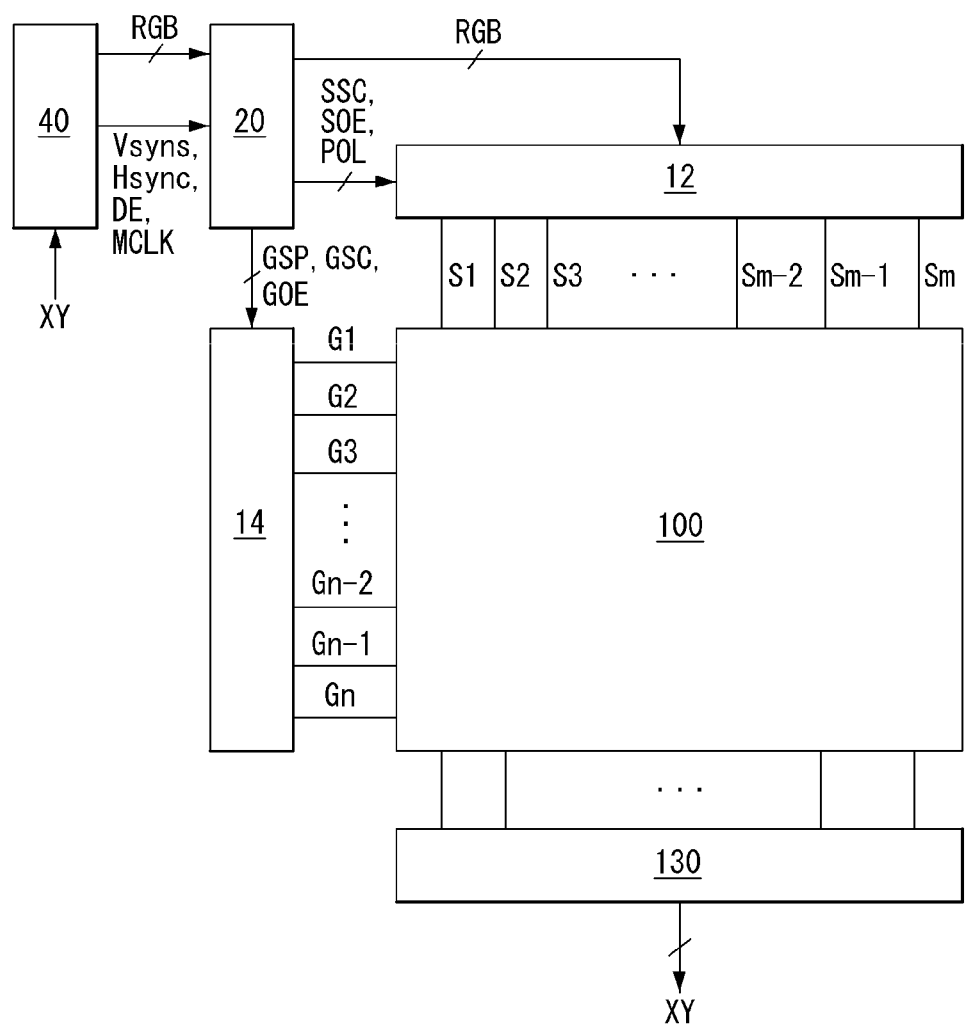
FIG. 15 is a view illustrating a configuration of a touch sensing device according to a second example embodiment of the present invention.
Figure 16:
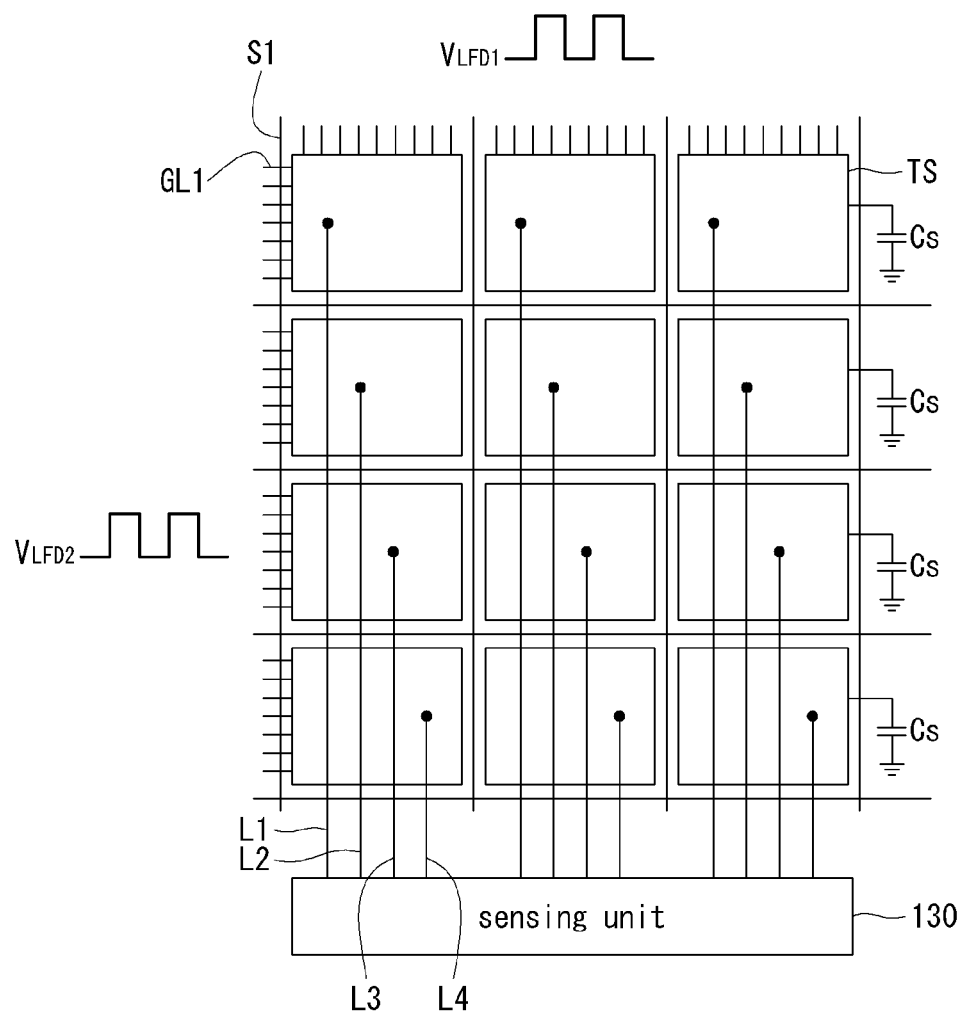
FIG. 16 is a schematic view illustrating a connection between a touch sensor Ts and a sensing unit 130 of a display panel according to the second example embodiment of the present invention.
Figure 17:
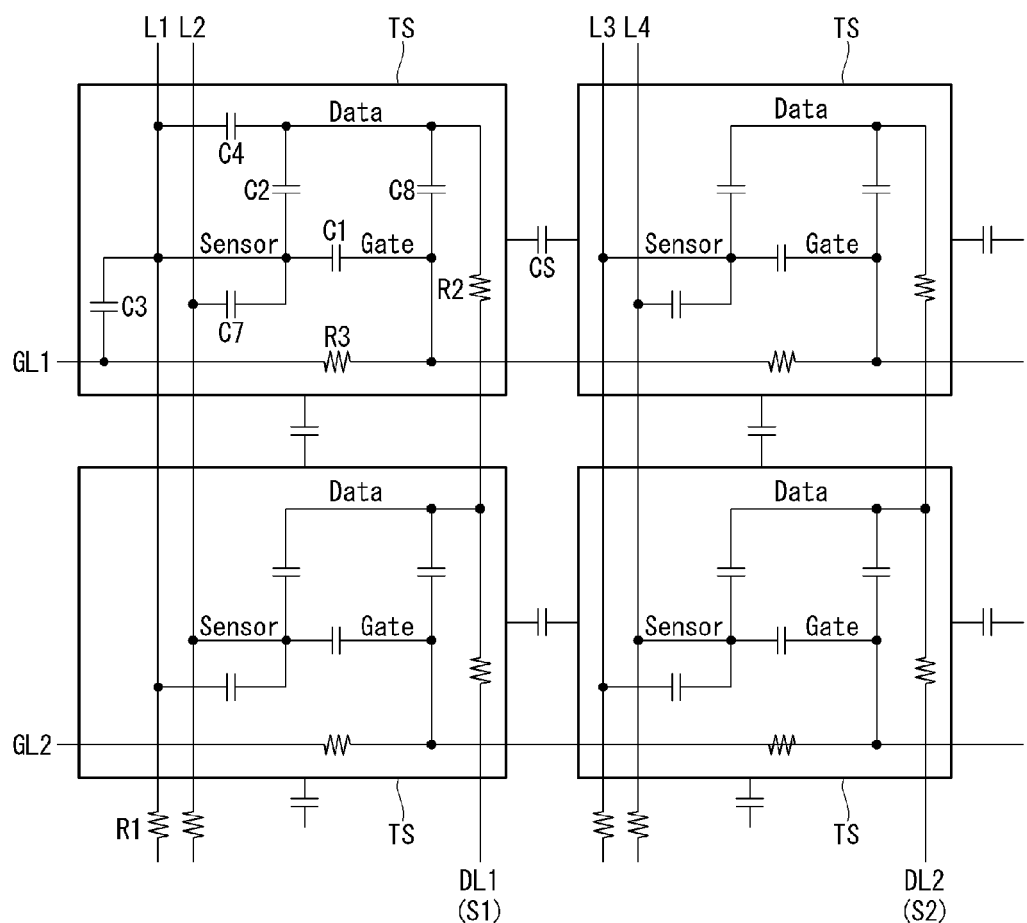
FIG. 17 is an equivalent circuit diagram illustrating parasitic capacitances in a self-capacitance sensor structure according to an example embodiment of the present invention.

FIG. 15 is a view illustrating a configuration of a touch sensing device according to a second example embodiment of the present invention, FIG. 16 is a schematic view illustrating a connection between a touch sensor Ts and a sensing unit 130 of a display panel according to the second example embodiment of the present invention. FIG. 17 is an equivalent circuit diagram illustrating parasitic capacitance in a self-capacitance sensor structure.

The touch sensing device according to the second example embodiment of the present invention includes a display panel 100, a data driving unit 12, a gate driving unit 14, a timing controller 20, and a sensing unit 130. The same reference numerals will be used for the components substantially identical to those of the example embodiments described above, and a detailed description thereof will be omitted.

Self-capacitance Cs is formed by touch sensors Ts divided from a common electrode. The touch sensors Ts are connected to sensor lines L1 to L4, respectively. Electrode patterns or touch sensor patterns may be formed of a transparent metal, such as indium tin oxide (ITO). The sensor lines L1 to L4 may be formed of a low-resistivity metal, such as copper (Cu). A touch sensor driving unit includes a charge pump (not shown) and the sensing unit 130. The charge pump supplies electric charges to a self-capacitance Cs from the touch sensors Ts through the sensor lines L1 to L4, respectively. The sensing unit 130 includes an analog circuit and an analog-to-digital converter (ADC). The analog circuit receives electric charges from the self-capacitance Cs and outputs an amount of change in electric charges before and after an applied touch, as an analog voltage. The ADC converts the analog voltage input from the analog circuit into digital data, and outputs touch low data.

In FIG. 17, C1 to C8 denote parasitic capacitances formed between the lines and electrodes. Namely, C1 is a parasitic capacitance between the touch sensor Ts and the gate line GL, and C2 is a parasitic capacitance between the touch sensor Ts and the data line DL. C3 is a parasitic capacitance between the sensor line L and the gate line GL, and C4 is a parasitic capacitance between the sensor line L and the data line S. C5 and C6 are parasitic capacitances between adjacent touch sensors Ts. C7 is a parasitic capacitance between the touch sensor Ts and other electrode lines, C8 is parasitic capacitance between the data line DL and the gate line GL.

The data lines DL1 to DLm receive a first parasitic capacitance suppressing signal VLFD1 during a touch sensor driving period Tt. The gate lines GL1 to GLn receive a second parasitic capacitance suppressing signal VLFD2 during the touch sensor driving period Tt. The first and second parasitic capacitance suppressing signals VLFD1 and VLFD2 change voltages at both ends of each parasitic capacitance to minimize an amount of electric charges charged in each parasitic capacitance. Namely, the first and second parasitic capacitance suppressing signals VLFD1 and VLFD2 simultaneously change total voltages at both ends of the parasitic capacitances, i.e., the sum of C1 to C8.

Also, like the first and second parasitic capacitance suppressing signals VLFD1 and VLFD2 according to the first example embodiment of the present invention described above, the first and second parasitic capacitance suppressing signals VLFD1 and VLFD2 according to the second example embodiment of the present invention are varied in proportion to the remaining parasitic capacitance. A process of varying voltage levels of the first and second parasitic capacitance suppressing signals VLFD1 and VLFD2 is the same as that of the first example embodiment of the present invention.

In the present invention, during the touch driving period, a touch driving signal may be applied to the Tx lines and, simultaneously, a parasitic capacitance suppressing signal as an AC signal in phase with the touch driving signal may be supplied to the pixel signal lines to minimize an influence of parasitic capacitances connected to the touch sensors.

In particular, in the present invention, in a case in which a parasitic capacitance remains even after a parasitic capacitance suppressing signal is provided, a voltage level of the parasitic capacitance suppressing signal is varied in proportion to the remaining parasitic capacitance. Accordingly, an influence of the remaining parasitic capacitance on the sensing operation can be prevented or further reduced.

By using the parasitic capacitance suppressing signal, a touch screen of the display device including in-cell touch sensors can be increased in size, and its resolution can be enhanced.

It will be apparent to those skilled in the art that various modifications and variations can be made in the touch sensing device and driving method of the present invention without departing from the spirit or scope of the invention. Thus, it is intended that the present invention cover the modifications and variations of this invention provided they come within the scope of the appended claims and their equivalents.

What is claimed is:

1. A touch sensing display device comprising:
   a plurality of gate lines and a plurality of data lines within a display panel;

a plurality of pixels at crossings of the gate lines and the data lines;

at least one touch sensor provided with a common voltage during a display period and provided with a touch driving signal during a touch period, the touch driving signal having a first peak to peak amplitude; and driving circuitry to provide a first parasitic capacitance suppressing signal to at least one gate line of the gate lines during the touch period, the first parasitic capacitance suppressing signal having a second peak to peak amplitude that is different than the first peak to peak amplitude of the touch driving signal, wherein the driving circuitry further provides a second parasitic capacitance suppressing signal to at least one data line of the data lines during the touch period, the second parasitic capacitance suppressing signal having a third peak to peak amplitude that is different than the second peak to peak amplitude of the first parasitic capacitance suppressing signal while the touch driving signal is provided to the at least one touch sensor, wherein a voltage level of the first parasitic capacitance suppressing signal provided to the at least one gate line or the second parasitic capacitance suppressing signal provided to the at least one data line is adjusted based on a voltage sensed by the driving circuitry while the first parasitic capacitance suppressing signal is provided to the at least one gate line or the second parasitic capacitance suppressing signal is provided to the at least one data line, the voltage varying depending on a parasitic capacitance of the display panel.

2. The touch sensing display device of claim 1, wherein the touch driving signal is in phase with the first parasitic capacitance suppressing signal.

3. The touch sensing display device of claim 1, wherein during the display period, the driving circuitry provides a gate pulse to the at least one gate line of the gate lines, the gate pulse swinging from a gate low voltage to a gate high voltage, and the first parasitic suppressing signal has lower peak voltage than the gate high voltage.

4. The touch sensing display device of claim 1, wherein the second peak to peak amplitude of the first parasitic capacitance suppressing signal is lower than the first peak to peak amplitude of the touch driving signal.

5. The touch sensing display device of claim 1, wherein the at least one touch sensor is a touch driving line provided with the common voltage during a display period and provided with the touch driving signal during the touch period, and the touch sensing device further comprises:

a touch receive line intersecting the touch driving line, the driving circuitry to provide the common voltage to the touch receive line during the display period and to provide a third parasitic capacitance suppressing signal to the touch receive line during the touch period.

6. A driving circuit for a display device, the display device comprising a plurality of gate lines and a plurality of data lines within a display panel, a plurality of pixels at crossings of the gate lines and the data lines, and at least one touch sensor, the driving circuit comprising:

a first circuit to provide the at least one touch sensor with a common voltage during a display period and provide a touch driving signal to the at least one touch sensor during a touch period, the touch driving signal having a first peak to peak amplitude;

a second circuit to provide a first parasitic capacitance suppressing signal to at least one gate line of the gate lines during the touch period, the first parasitic capacitance suppressing signal having a second peak to peak amplitude that is different than the first peak to peak amplitude of the touch driving signal; and a third circuit to provide a second parasitic capacitance suppressing signal to at least one data line of the data lines during the touch period, the second parasitic capacitance suppressing signal having a third peak to peak amplitude that is different than the second peak to peak amplitude of the first parasitic capacitance suppressing signal while the touch driving signal is provided to the at least one touch sensor, wherein a voltage level of the first parasitic capacitance suppressing signal provided to the at least one gate line or the second parasitic capacitance suppressing signal provided to the at least one data line is adjusted based on a voltage sensed by the driving circuit while the first parasitic capacitance suppressing signal is provided to the at least one gate line or the second parasitic capacitance suppressing signal is provided to the at least one data line, the voltage varying depending on a parasitic capacitance of the display panel.

7. The driving circuit of claim 6, wherein the touch driving signal is in phase with the first parasitic capacitance suppressing signal.

8. The driving circuit of claim 6, wherein during the display period, the second circuit provides a gate pulse to the at least one gate line of the gate lines, the gate pulse swinging from a gate low voltage to a gate high voltage, and the first parasitic suppressing signal has lower peak voltage than the gate high voltage.

9. The driving circuit of claim 6, wherein the second peak to peak amplitude of the first parasitic capacitance suppressing signal is lower than the first peak to peak amplitude of the touch driving signal.

10. The driving circuit of claim 6, wherein the at least one touch sensor is a touch driving line provided with the common voltage during a display period and provided with the touch driving signal during the touch period, and the driving circuit comprises:

a fourth circuit to provide the common voltage to a touch receive line intersecting the touch driving line during the display period and to provide a third parasitic capacitance suppressing signal to the touch receive line during the touch period.

11. A method of operation in a display device, the display device comprising a plurality of gate lines and a plurality of data lines within a display panel, a plurality of pixels at crossings of the gate lines and the data lines, and at least one touch sensor, the method comprising:

providing a common voltage to the at least one touch sensor during a display period;

providing a touch driving signal to the at least one touch sensor during a touch period, the touch driving signal having a first peak to peak amplitude; and providing a first parasitic capacitance suppressing signal to at least one gate line of the gate lines during the touch period, the first parasitic capacitance suppressing signal having a second peak to peak amplitude that is different than the first peak to peak amplitude, providing a second parasitic capacitance suppressing signal to at least one data line of the data lines during the touch period, the second parasitic capacitance suppressing signal having a third peak to peak amplitude that is different than the second peak to peak amplitude of the first parasitic capacitance suppressing signal while the touch driving signal is provided to the at least one touch sensor, wherein a voltage level of the first parasitic capacitance suppressing signal provided to the at least one gate line or the second parasitic capacitance suppressing signal provided to the at least one data line is adjusted based on a voltage sensed while the first parasitic capacitance suppressing signal is provided to the at least one gate line or the second parasitic capacitance suppressing signal is provided to the at least one data line, the voltage varying depending on a parasitic capacitance of the display panel.

12. The method of claim 11, wherein the touch driving signal is in phase with the first parasitic capacitance suppressing signal.

13. The method of claim 11, further comprising:

during the display period, providing a gate pulse to the at least one gate line of the gate lines, the gate pulse swinging from a gate low voltage to a gate high voltage, and the first parasitic suppressing signal has lower peak voltage than the gate high voltage.

14. The method of claim 11, wherein the second peak to peak amplitude of the first parasitic capacitance suppressing signal is lower than the first peak to peak amplitude of the touch driving signal.

15. The method of claim 11, wherein the at least one touch sensor is a touch driving line provided with the common voltage during a display period and provided with the touch driving signal during the touch period, and the method comprises:

providing the common voltage to a touch receive line intersecting the touch driving line during the display period; and providing a third parasitic capacitance suppressing signal to the touch receive line during the touch period.

16. The touch sensing display device of claim 1, further comprising:

a first multiplexer having an input to receive a first high potential voltage and another input to receive a first low potential voltage, the first multiplexer selecting between the first high potential voltage and the first low potential voltage to generate the first parasitic capacitance suppressing signal such that the first parasitic capacitance suppressing signal swings between the first high potential voltage and the first low potential voltage; and a second multiplexer having an input to receive a second high potential voltage and another input to receive a second low potential voltage, the second multiplexer selecting between the second high potential voltage and the second low potential voltage to generate the second parasitic capacitance suppressing signal such that the second parasitic capacitance suppressing signal swings between the second high potential voltage and the second low potential voltage.

\* \* \* \* \*